United States Patent [19]

Heindl et al.

[11] Patent Number: 4,589,810
[45] Date of Patent: May 20, 1986

[54] DEVICE FOR PROGRAMMING MOVEMENTS OF A ROBOT

[75] Inventors: Johann Heindl; Gerhard Hirzinger, both of Seefeld, Fed. Rep. of Germany

[73] Assignee: Deutsche Forschungs- und Versuchsanstalt fuer Luft- und Raumfahrt e.V., Cologne, Fed. Rep. of Germany

[21] Appl. No.: 545,737

[22] Filed: Oct. 26, 1983

[30] Foreign Application Priority Data

Oct. 30, 1982 [DE] Fed. Rep. of Germany ....... 3240251

[51] Int. Cl.$^4$ ............................................. B25J 3/00
[52] U.S. Cl. .......................................... 414/5; 414/4; 901/4; 901/5; 901/23; 74/471 XY
[58] Field of Search ...................... 901/4, 5, 50, 28, 3, 901/23; 414/1, 4, 5, 730; 74/471 XY

[56] References Cited

U.S. PATENT DOCUMENTS

| 4,132,318 | 1/1979 | Wang et al. ......................... 901/34 X |
| 4,194,437 | 3/1980 | Rosheim ............................ 901/28 X |
| 4,216,467 | 8/1980 | Colston ............................... 414/4 X |
| 4,221,997 | 9/1980 | Flemming ........................... 414/4 X |
| 4,348,142 | 9/1982 | Figour ................................. 901/5 X |
| 4,367,532 | 1/1983 | Crum et al. ......................... 414/4 X |

OTHER PUBLICATIONS

"Robots With Force-Torque Sensing", Hirzinger, Process Automation, No. 1, pp. 8-12, 1982.
"Effect of Hand-Based Sensors on Manipulator Control Performance", Bejczy, Mechanism and Machine Theory, vol. 12, No. 5, pp. 547-567, 1977.

Primary Examiner—Terrance L. Siemens
Attorney, Agent, or Firm—Collard, Roe & Galgano

[57] ABSTRACT

There is provided a device for programming motions and operational forces or torques of a robot, and a device for carrying out the method. The device includes a handle grip-sensor unit which includes a known sensor of forces and/or torques of the type which defines a load pick-up plate connected via spokes to a peripheral ring and via upright supports to a rigid base part. The peripheral ring is connected to an inner wall of a hollow body whose outer wall is shaped to match the contours of the human hand. The base part is rigidly connected either to an inertial platform or to an end link of the robot. The output of the sensor is connected to link driving means of the robot via a data-processing unit which converts the output signals from the sensor into data corresponding to forces or torques applied by the operator to the handgrip-sensor unit. The data-processing unit includes an algorithm which converts the output signals from the sensor into drive commands for the joint drives of the robot and adjusts the system of coordinates of the handgrip-sensor unit to the system of coordinates of movements of an actuator on the end link of the robot.

1 Claim, 7 Drawing Figures

DEVICE FOR PROGRAMMING MOVEMENTS OF A ROBOT

BACKGROUND OF THE INVENTION

The present invention relates in general to robotics and in particular it relates to a device for programming motions and/or forces and/or torque of an articulated robot of the type having at least one end link provided with an actuator engageable with the environment, driving means for imparting translational and/or rotary movements to the end link, and control means for applying control commands to the driving means to move the end link in a system of coordinates.

Conventionally, industrial robots or manipulators are controlled or programmed via arrays of keys. The disadvantage of this prior-art method is in the relatively difficult guidance of the robot along a non-linear path. A similar disadvantage occurs in programming by entering numerical values through computer terminals. When using so-called "joy sticks" for programming robot movements, there is no possibility to generate six-dimensional control commands. In known methods in which the robot, after disconnection of its link driving motors, is guided by means of a manipulating handle grip, there is a program that the requisite mechanical counterbalance depends on the tool manipulated by the robot. Moreover, in such prior-art methods and devices, it is extremely difficult to transfer to the robot the proper working forces/torque even if the robot is provided with a force/torque sensor. The latter sensor, which is suitable for controlling or programming the movements of a robot or manipulator is known for example from the German Pat. No. 2,727,704 and is employed for sensing a force or a rotary movement.

SUMMARY OF THE INVENTION

A general object of the present invention is to overcome the aforementioned disadvantages and shortcomings of prior-art methods and devices for programming an industrial robot or a remotely controlled manipulator.

An additional object of the invention is to make the programming and controlling operations for such robots or manipulators substantially easier and faster.

A further object of the invention is to provide a method for combining programs for movements or working forces or torques for the robot.

A still further object of this invention is to provide a structurally simple and reliable device for carrying out the method of this invention.

The device of this invention includes a hand grip secured to an inertial frame of reference and including a hollow body adjusted in size to the anatomy of the human hand, the first sensor being rigidly connected to the inner wall of the hollow body in such a manner that the measuring center point coincides substantially with the center point of the hollow body.

In a preferred embodiment of this invention, there is employed a six-dimensional force/torque sensor of the type described for example in the aforementioned German Pat. No. 2,727,704. The hollow body surrounding the sensor is made of a light material such as a plastic material which has an opening through which passes the lower part of the sensor. The hollow body is preferably in the form of a hollow sphere or in a form which matches the contours of the human hand. Due to the coincidence of the measuring center point of the sensor and of the center point of the hollow handle, the forces and torques exerted by an operator on the hand grip/sensor are reliably balanced out. If the forces exerted by the hand of the operator on the hand grip/sensor are in a spatially fixed system of orthogonal coordinates x, y and z which correspond with translational speed commands of a robot terminal actuator such as a gripper or a tool, or if torques to be effected about one of these axes of the fixed orthogonal system correspond to the commands for the rotational speed of the end actuator about one of these axes or about a selected center of rotation (tip of the actuator or of the tool, for example), then the terminal actuator of the robot can be controlled in space which is defined by the system of coordinates.

The correlation between forces/torques and translational/rotational speeds can be determined by a static or dynamic relationship, namely from a so-called regulating rule or control law. According to this rule or law, the conversion of commands for a cartesian system into commands for controlling the links of a robot is generally known in the art, and for the purposes of this invention need not be described in detail. The values determining the path of movement of the links of the robot can be stored and employed later on for the repetitious operation.

As mentioned before, in order to control or program the motions of the robot or manipulator in accordance with this invention the first sensor (six-dimensional force/torque sensor which is fixedly mounted to the inner wall of a hollow handle) has its free end fixedly mounted relative to the surrounding space, that is, it is fixed to an inertial platform. As a result, the measuring directions coincide with the aforementioned cartesian inertial system of the robot. The measuring directions of the sensor, however, can be also determined in a coordinate system which is fixed relative to the tool or actuator of the robot. In this case the robot to be controlled should possess at least five axes of motion. This arrangement is advantageous for remote control of a robot or manipulator designed for example as a remotely controlled manipulator in nuclear technology or for underwater or for space applications.

In a modification, the hand grip-sensor of this invention is fixedly mounted on the terminal actuator of the robot or manipulator so as to program the motions of the latter by directly guiding its end actuator. The signals generated by the sensor in the hand grip are then recalculated in values corresponding to a spatially fixed coordinate system, and the latter values serve similarly as in the preceding example (with spatially fixed sensor grip) for calculation of translational and rotational speed commands. This programming modification in which the robot is first manually guided by the operator so as to show him the desired motions, is applicable in all kinds of "follow-up robots" used for paint spraying or varnishing surfaces. In this case, the follow-up robot should perform motions about six axes.

If it is desired to program a combination of motions and processing forces or torques of the robot, there is employed a second six-dimensional force-torque sensor which in addition to the first-mentioned handle grip-sensor is also fixed to a stationary platform (spatially fixed) or fixedly mounted between the end link of the robot and its terminal actuator. This second sensor in the following description will be referred to as a robot link sensor. In this case, the coordinate or correlation concept is applied for controlling the robot or manipulator so that the latter in the absence of a mechanical contact with its fixed environment is guided according to one of the aforedescribed methods while upon establishing a mechanical contact with its environment it readjusts itself to those contact forces or torques which were preprogrammed to it by the manual operation of the hand grip sensor. In a simple embodiment of this correlation concept, the translation and rotation commands for the robot are derived from the sum of forces/torques in the hand grip sensor (first sensor) and in the robot link sensor (second sensor). In this manner, a continuous transition results between the control of translational and rotational movements of freely movable robot (no contact with the environment) and the regulation of force/torque when such a contact has been established.

In this embodiment, employing the robot link sensor, it is advisable to compensate by computation any errors which may result due to a changed spatial position or due to strong acceleration of the terminal actuator, depending on the weight or inertia of the latter. The path of movement of the terminal actuator of the robot as well as forces or torques detected or sensed during this movement, are preferably stored in a memory so as to be retrievable for subsequent repeated use. If in view of a particular configuration of the terminal tool or actuator, it is expected that reaction torques will result in the robot link from the contact with the environment, while only forces have been programmed by the human hand, then it is necessary that the momentary coupling of the robot link sensor be neutralized by computation.

As mentioned before, in order to combine the motions of the robot with the program for processing forces or torques, the handle grip-sensor should be fixed either to a stationary platform or to the end actuator of the robot, in addition to the second robot arm sensor. In the latter case care should be taken that the handle grip sensor be attached to the end actuator after the last robot link but before the robot link sensor. The method of this invention thus opens a new possibility for programming the operation of a robot by providing not only commands for moving the robot in six degrees of freedom in accordance with movements of the human hand but also by enabling the feeding of immediate information about forces to be exerted on the environment.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
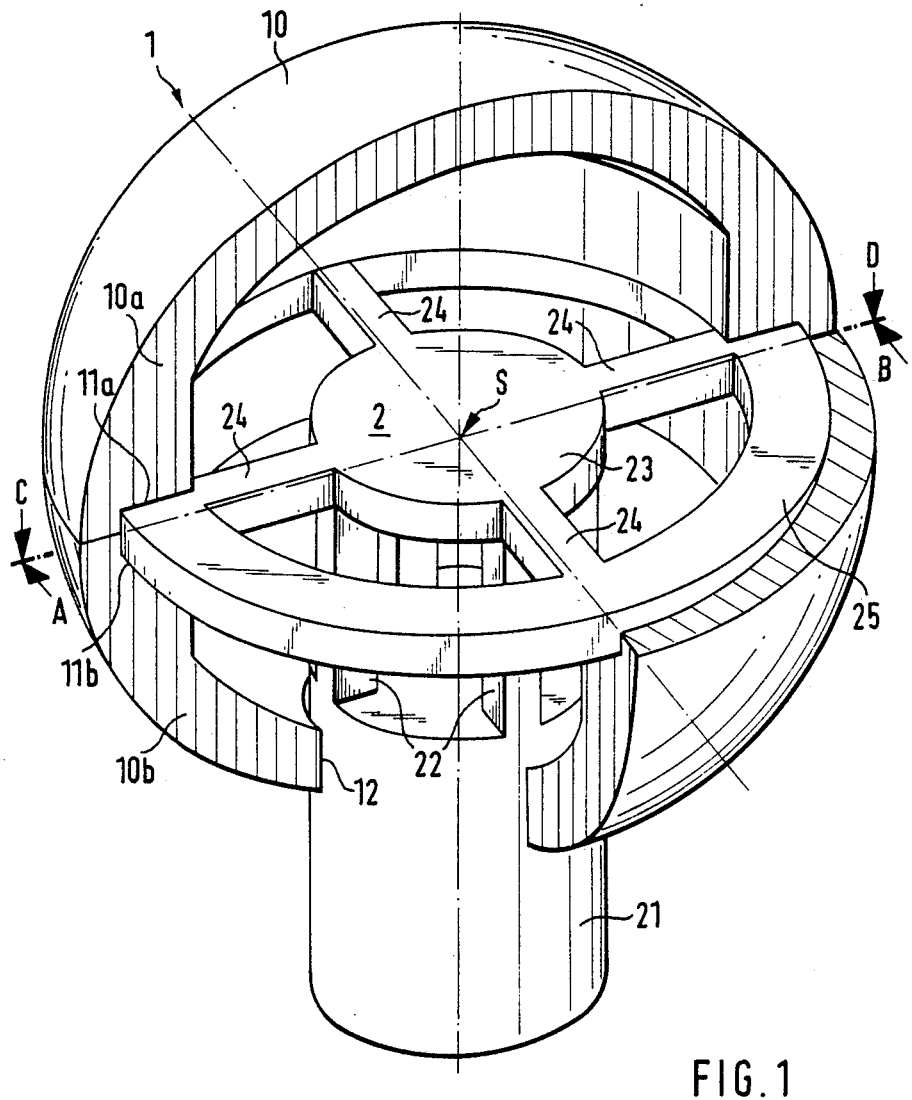
FIG. 1 is a perspective view, partly in section, of a hand grip-sensor of this invention.
Figure 2A:
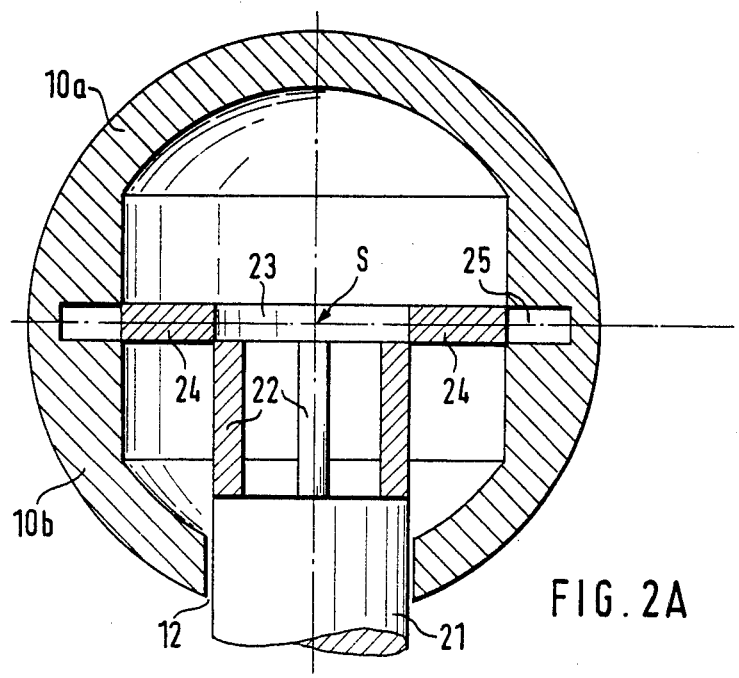
FIG. 2a is a vertical cross-section along the axis A-B of the hand grip sensor of FIG. 1.
Figure 2B:
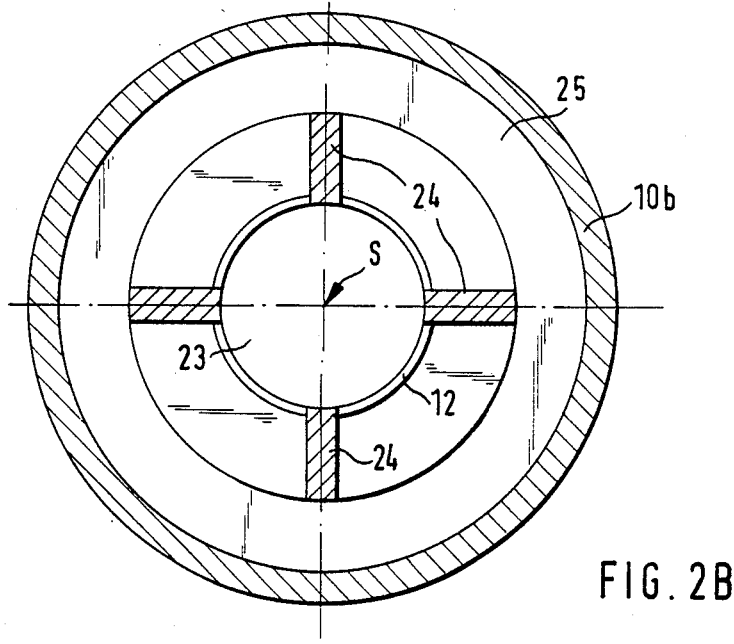
FIG. 2b is a horizontal cross-section along the axis C-D in FIG. 1.

Referring firstly to FIGS. 1 and 2, reference numeral 2 indicates a prior-art force/torque sensor corresponding for example to the sensor described in the aforementioned German Pat. No. 2,727,704. Sensor 2 is integrally connected to the inner wall of a hollow sphere 10 which is preferably made of a light material such as a rigid and hard plastic material. In this example, the hollow sphere 10 consists of two hemispheres 10a and 10b, whereby the lower hemisphere 10b is formed with a downwardly directed opening 12 for passing through the projecting part of the sensor 2. Inner wall portions of each of the two hemispheres are provided in the range of their interfaces with annular grooves 11a and 11b in which a circumferential ring 25 of the sensor is firmly clamped after the two hemispheres are rigidly connected one to another for example by means of a non-illustrated screw connection.

The circumferential ring 25 of sensor 2 is connected via four spokes 24 to a load pick-up plate 23. The lower surface of the load pick-up plate 23 is connected via four supports 22 extending at right angles to the spokes 24 and being integral with a base piece 21 which is directed downwards through the opening 12 of the lower hemisphere 10b. According to this invention, the sensor 2 is arranged in the spherical hollow body 10 in such a manner that the measuring center point S of the pick-up plate 23 coincides substantially with the center of the spherical body 10. In the following description, this integral connection of the force-torque sensor 2 with the hollow sphere 10 will be referred to as a handgrip-sensor 1. By virtue of the centering of the measuring center point S in the sphere 10, it is possible to reliably even out the forces and torques which are exerted by the human hand 6 (FIGS. 3–6) on the spherical handgrip 1. As known from the aforementioned German patent, strain measuring gauges, or strips are applied to the upper and lower sides of the spokes 24 and to the vertical sides of the posts 22 which are at right angles to the circumferential ring so as to produce voltages proportional to deformation or bending of the pick-up plate relative to a fixed inertial platform. Instead of bending, it is also possible to measure perpendicular displacements of at least three points on the load pick-up plate 23 relative to the plane of the ring 25, and the horizontal displacements of at least three points on the pick-up plate 23 or of the ring 25 relative to the sensor base 21. This vertical and horizontal displacement of the pick-up plate can be measured by means of any suitable sensors known in the art.

In FIGS. 3–6, there is schematically illustrated a robot 3 having an articulated arm whose links 35 are interconnected by joints 31, 31', 31" and 31"'. An end actuator 33 in the form of a gripper is mounted to the free end of the last link below the indicated axis 32 of the robotic system. Human hand 6, by imparting movements and/or forces and/or torques to the hand grip-sensor 1 (2), creates signals which upon conversion into data suitable for processing according to a program, control the robot 3 so that its arm follows the movements and forces imparted to the handgrip-sensor. The actual movements of the end actuator 33 are supervised visually by the operator (indicated schematically by human eye 61).

Figure 3:
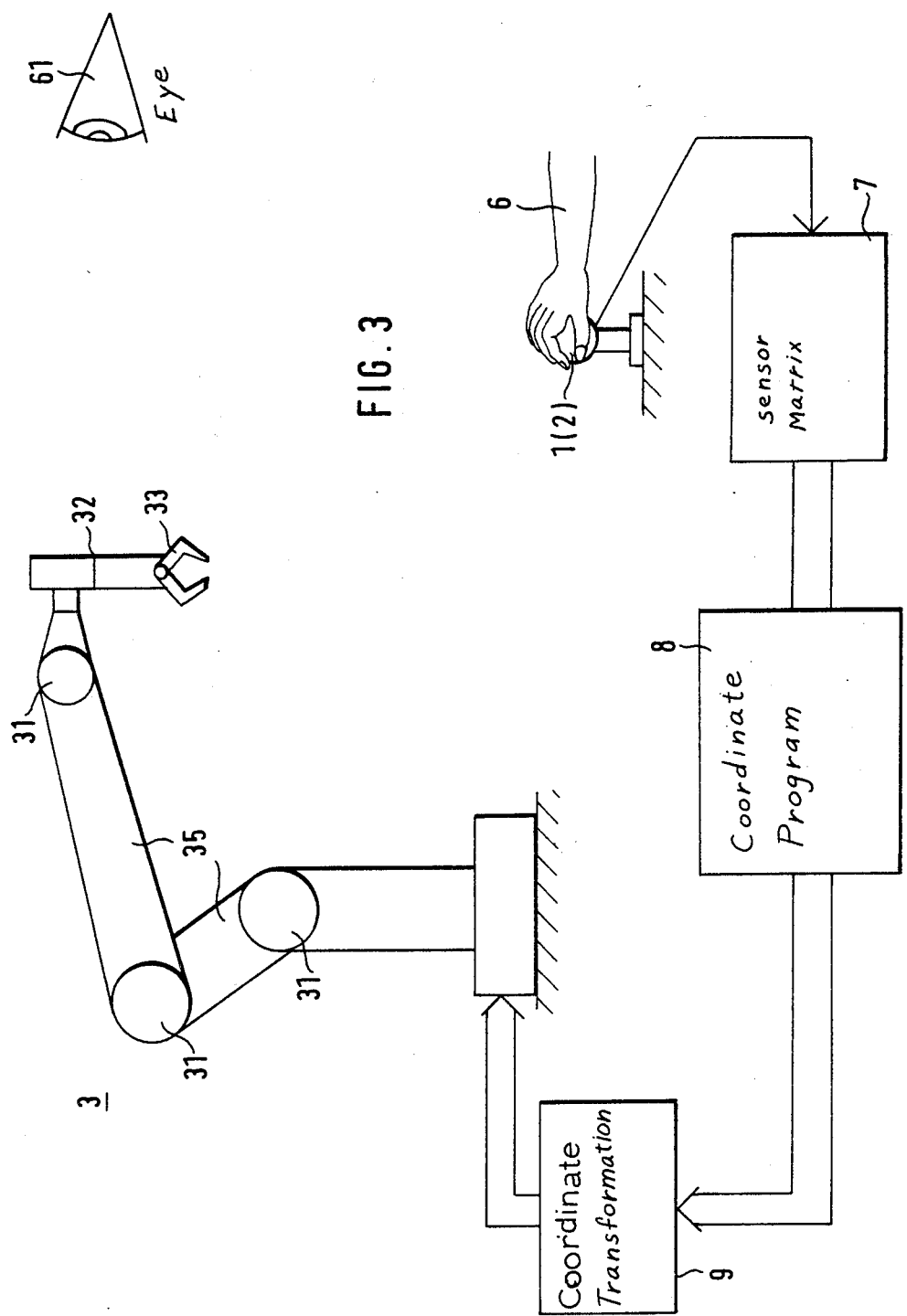
FIG. 3 is a schematic illustration of an embodiment of controlling or programming the movement of a robot by means of a spatially fixed hand grip-sensor, with indicated programming flowchart.

In the embodiment according to FIG. 3, handgrip-sensor 1 (2) is fixed relative to the surrounding space. As soon as the operator's hand 6 transfers to the hollow body of the handgrip-sensor assembly the movements and forces to be replicated by the robot 3, the sensor 2 produces corresponding voltages. These signals are multiplied in a sensor matrix 7 and converted into values indicative of forces K or moments M. These forces K and M are converted by means of a corresponding algorithm or a control law in unit 8 into translational/rotary speeds $\dot{x}$ and $\dot{y}$. These translational and rotary speeds $\dot{x}$ and $\dot{y}$ are transformed in unit 9 from a rectangular cartesian coordinate system into command signals for the robot joint drives via so called "coordinates transformation" and the resulting command signals are applied to corresponding drives in the robot joints 31. As well known in the art of data processing, the signals produced by the handgrip-sensor 1, and hence the control data for the program of the robot, can be stored for later use. Due to the fact that the handgrip-sensor assembly 1 is fixed relative to the surrounding space, similarly as is the base of the robot 3, the directions entered in the handgrip sensor 1 match the orthogonal cartesian system of coordinates of the robot 3. In a modification, the directions of movement entered by means of the sensor 2 can be also related to a coordinate which is fixed relative to the movable tool or end actuator 33, as will be described in greater detail below. The embodiment of FIG. 3 is suitable for a remote control of the robot 3 is used for example in remotely controlled manipulators in nuclear technology, in underwater technology, or in space technology.

Figure 4:
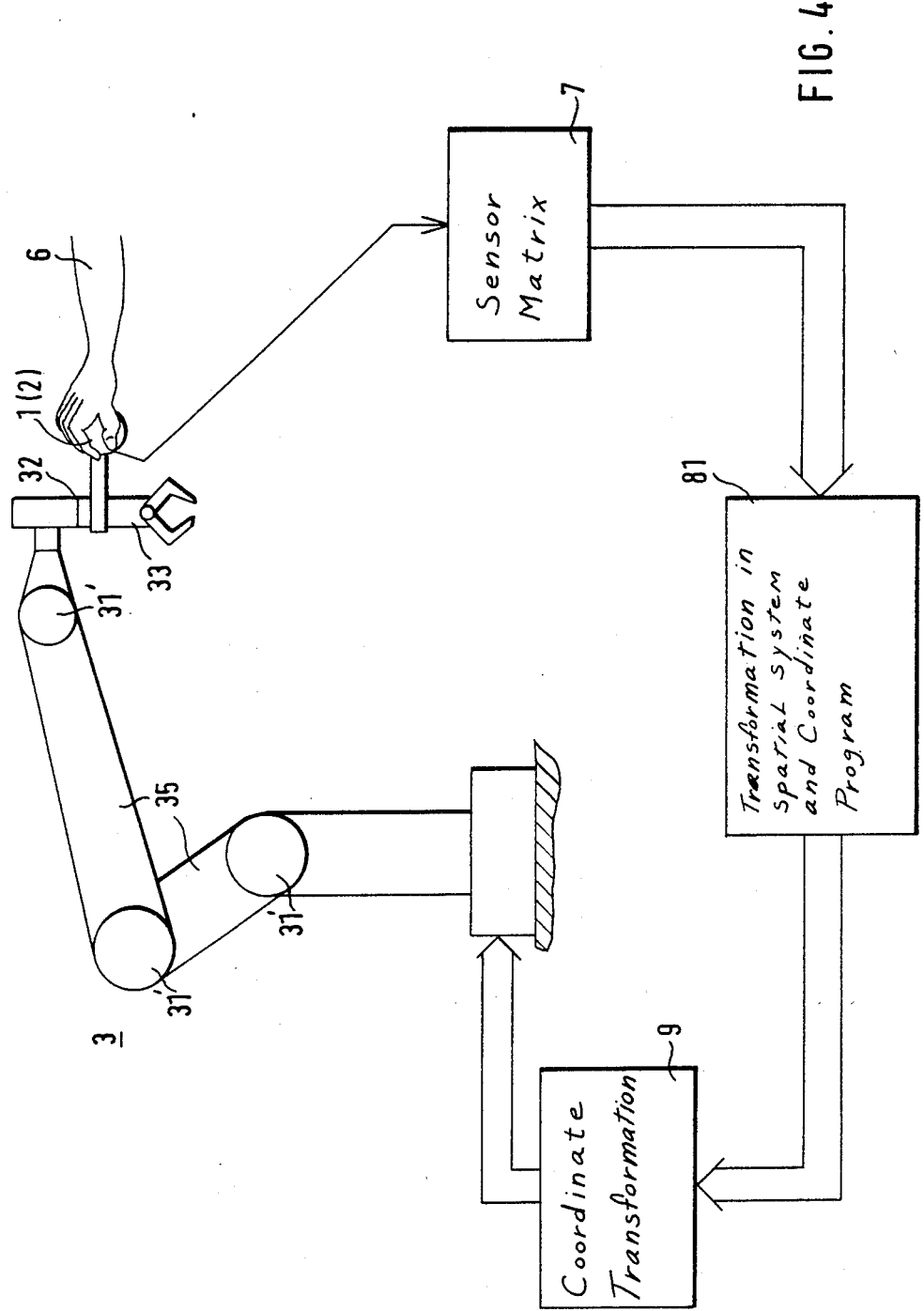
FIG. 4 is a modified arrangement of this invention in which the hand grip-sensor is secured to the terminal actuator of the robot.

The embodiment of FIG. 4 differs from the preceding embodiment of FIG. 3 by fixing the handgrip-sensor 1 immediately on the end actuator 33 of the robot. Similarly as in the preceding example, signals generated by sensor 2 in the handgrip-sensor assembly 1 are fed to a sensor matrix 7 where upon multiplication the signals are converted into data corresponding to forces K or moments M. These forces/moments are transformed in a system of coordinates which is fixed in space and then by means of a corresponding algorithm or control law 81 are again transformed into translational and rotational speed data $\dot{x}/\dot{y}$. Similarly as in FIG. 3, these data are again transformed in a coordinate-transformation step 9 into commands suitable for controlling drives in joint 31 of the robot arm 35. Hence, in this arrangement the human hand positively guides the arm of robot 3 along the desired path of movement and in doing so is directly programming these movements. This kind of arrangement results in the so-called "follow-up robot" which is used for example for painting surfaces. The arm of the follow-up robot is movable along six axes of motion.

Figure 5:
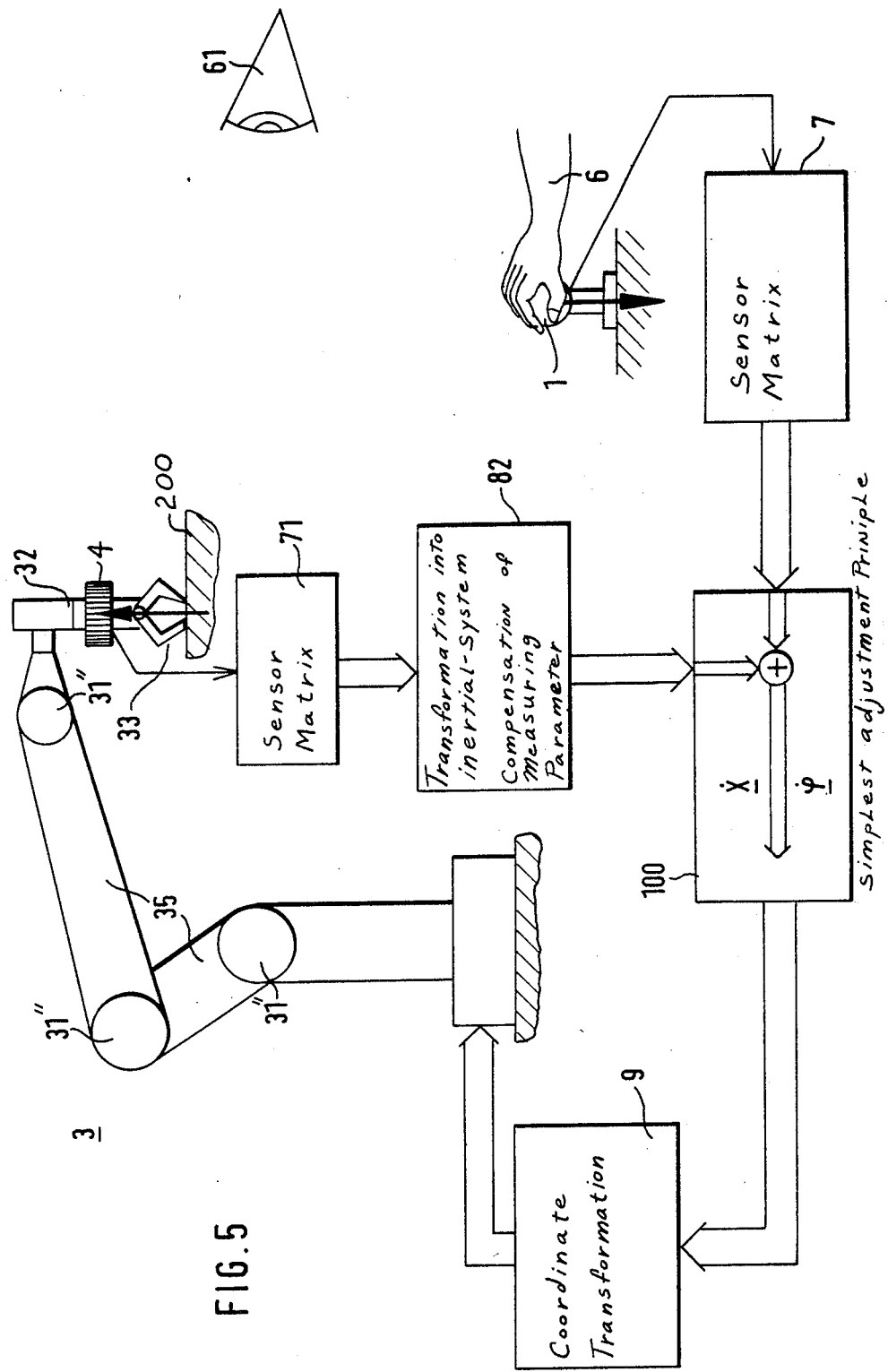
FIG. 5 is a further modification of the arrangement of FIG. 3, in which the terminal actuator of the robot is provided with a fixedly mounted force-torque sensor and the illustrated flowchart indicates the programming method by means of a fixedly supported handgrip-sensor.

FIG. 5 illustrates an arrangement similar to FIG. 3 in which the handgrip-sensor 1 is fixedly mounted to a fixed platform. An additional sensor 4 designed for sensing forces or moments in six dimensions is mounted between the last link below the axis 32 and the end actuator 33. For controlling the robot 3 in this arrangement, a correlation concept is used according to which the robot in the absence of a mechanical contact with a fixed object is guided in accordance with the embodiment of FIG. 3, whereas when a contact with the environment (for example workpiece 200) is established the robot arm is adjusted to those contact forces or torques which are exerted by the human hand 6 on the handgrip-sensor 1.

The second sensor 4, arranged on the end link of the robot arm (the so-called robot joint sensor) is coupled to a matrix 71 in which the signals delivered by the latter sensor are converted by multiplication into data indicative of forces $K_{Rob}$ or moments $M_{Rob}$ which in further processing step 82 are transformed into inertial-system values $K_{Rob}^i$ and $M_{Rob}^i$. At this processing stage, a measuring value compensation can be performed before or after the transformation of forces $K_{Rob}$ or $M_{Rob}$ into the inertial values. This compensation is subject to load variations of the end actuator 33. Thereafter, in the simple processing example as illustrated in FIG. 5, the inertial values of forces or moments $K_{Rob}^i$ and $M_{Rob}^i$ from the robot sensor 4 are added in a summer to forces $K_{Men}^i$ or $M_{Men}^i$ from the sensor 2 in the handgrip-sensor 1 and directly converted into translational and rotational speeds. Similarly as in the examples of FIGS. 3 and 4, the translational and rotational speeds $\dot{x}$ or $\dot{y}$ are again converted in a coordinate transformation system 9 into suitable joint control commands applied to drives for joints of the robot arm. When, due to a particular configuration of the gripper 33 the reaction moments are generated in the joints of robot arm after contact of the gripper with a fixed object, even if forces only have been preprogrammed by the human hand on the handgrip-sensor 1, then the signals produced by the second sensor 4 in response to those reaction moments can be neutralized in the subsequent data processing step.

Figure 6:
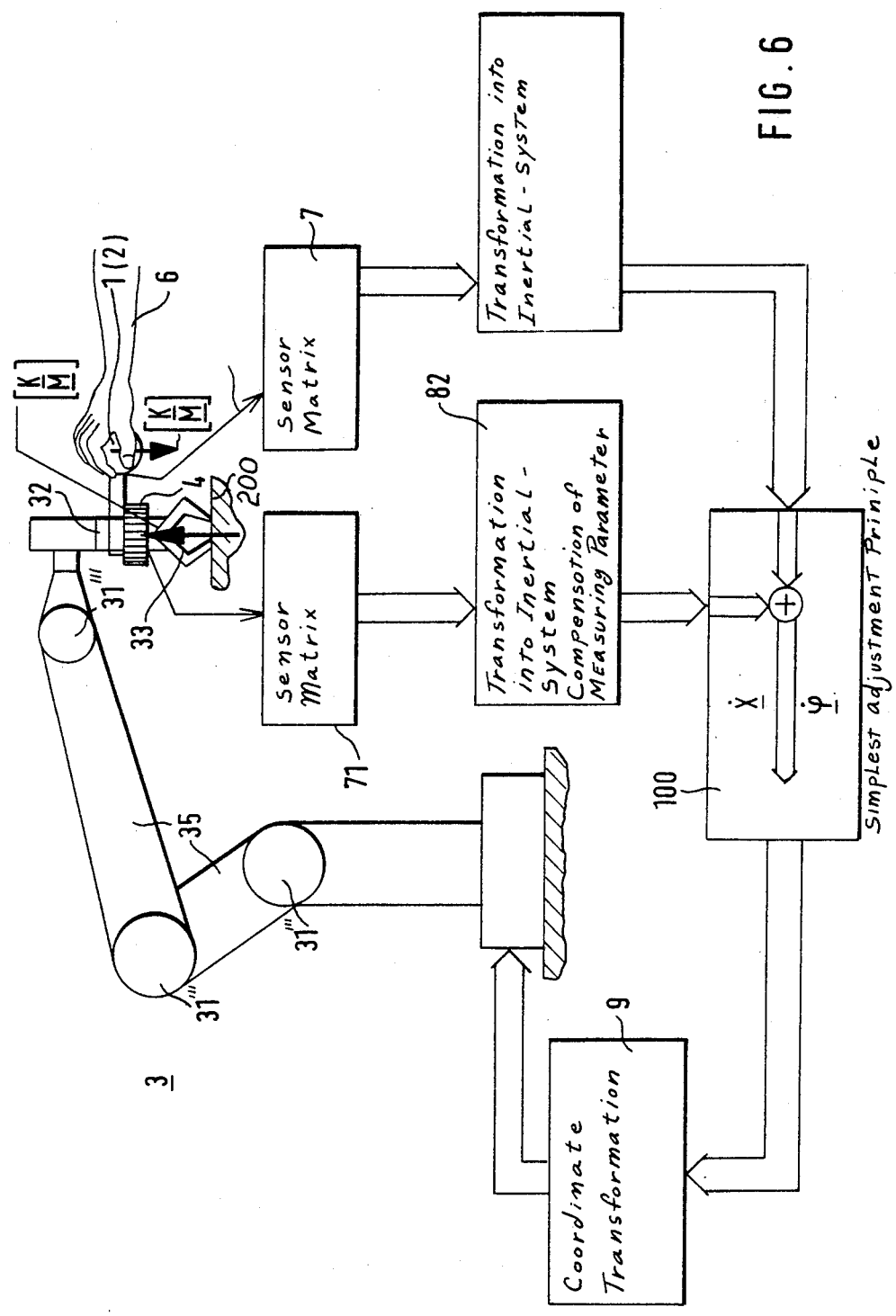
FIG. 6 is a schematic illustration of a modified version of the arrangement of FIG. 5 in which the movable end link of the robot is provided with a force-torque sensor as well as with the handgrip-sensor, and a flowchart indicates the method of programming the robot by means of this sensor arrangement.

The arrangement of FIG. 6 is a combination of the aforedescribed arrangements of FIGS. 5 and 4. In this example, the handgrip-sensor 1 (2) is fixed to the last link of the robot arm below the axis 32 of the last arm joint but before the second robot arm sensor 4.

The arrangements disclosed in FIGS. 5 and 6 enable the study or practicing of motions introduced by human hand directly to the robot arm and the study of changing effects of forces or moments on the robot 3 on its environment, such as on a workpiece 200 or a reception device in installation processes and the like. On the other hand, the arrangements illustrated in FIGS. 3 and 4 are suitable for programming motions of the robot or manipulator only without controlling the forces and moments after a mechanical contact with a fixed object.

It will be understood that each of the elements described above, or two or more together, may also find a useful application in other types of constructions differing from the types described above.

While the invention has been illustrated and described as embodied in specific arrangements of robotic systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a device for programming motions, forces, and torques of an articulated robot having an end link provided with an actuator, including driving means for imparting translational and rotary movements to the end link, and control means for applying control commands to the driving means to move the last link according to a system of coordinates, the improvement comprising a hand grip sensor unit assembled of a force momentum sensor having a deformable measuring part and a rigid base part, and a hollow spherically configured body formed of a rigid plastic material with an opening therein for the base part of the sensor and an inner surface portion rigidly connected to the measuring part of the sensor, said spherical body being assembled of two rigidly connected hemispheres, said opening being formed in one hemisphere defining a center axis normal to the separation plane of the two hemispheres, an annular groove formed in the inner surface portion extending in the separation plane of the two hemispheres and the measuring part of the sensor having a ring shaped portion which fits snugly into said annular groove, and the measuring part of said sensor includes a load pick-up plate connected to said ring by uniformly distributed spokes and further being connected to said base part of the sensor by straight supports which are directed at right angles to said spokes so that the measuring center point of the entire hand grip-sensor unit is located in the center point of the spherical hollow body and in the separation plane of the two hemispheres.

* * * * *